(12) United States Patent
Joseph

(10) Patent No.: US 9,645,482 B2
(45) Date of Patent: May 9, 2017

(54) FAIL-SAFE PROJECTION SYSTEM

(71) Applicant: Disney Enterprises, Inc., Burbank, CA (US)

(72) Inventor: Daniel Joseph, Sunland, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 76 days.

(21) Appl. No.: 14/643,805

(22) Filed: Mar. 10, 2015

(65) Prior Publication Data
US 2016/0266479 A1    Sep. 15, 2016

(51) Int. Cl.
G03B 21/32      (2006.01)
G03B 21/26      (2006.01)
G03B 21/606     (2014.01)
G03B 21/20      (2006.01)
H04N 13/04      (2006.01)
H04N 13/00      (2006.01)
G03B 17/54      (2006.01)

(52) U.S. Cl.
CPC ........... G03B 21/26 (2013.01); G03B 21/208 (2013.01); G03B 21/2033 (2013.01); G03B 21/2053 (2013.01); G03B 21/32 (2013.01); G03B 21/606 (2013.01); H04N 13/004 (2013.01); H04N 13/0459 (2013.01); G03B 17/54 (2013.01)

(58) Field of Classification Search
CPC ...... G03B 21/20; G03B 21/32; H04N 13/004; H04N 13/0459; H04N 13/0468
See application file for complete search history.

(56) References Cited

U.S. PATENT DOCUMENTS

2006/0221302 A1*  10/2006  Paige ................. G03B 21/32
                                              352/40
2015/0085082 A1*   3/2015  Zierke ................ H04N 13/004
                                              348/48

* cited by examiner

*Primary Examiner* — Sultan Chowdhury
(74) *Attorney, Agent, or Firm* — Dorsey & Whitney LLP

(57) ABSTRACT

The technology described herein relates generally to a projection system having a fail-safe feature for use in a presentation or display. In one example a projection system having at least one main projector projects a first image onto a main projection area of a projection surface. The projection system may further include a relief projector that when activated projects a second image onto a backup projection area of the projection surface. The projection system may be provided with a sensor capable of sensing at least one characteristic of the at least one main projector, the main projection area, or the projection surface. The projection system may include a control system in communication with the sensor, wherein the control system activates the relief projector in response to the sensor.

22 Claims, 11 Drawing Sheets

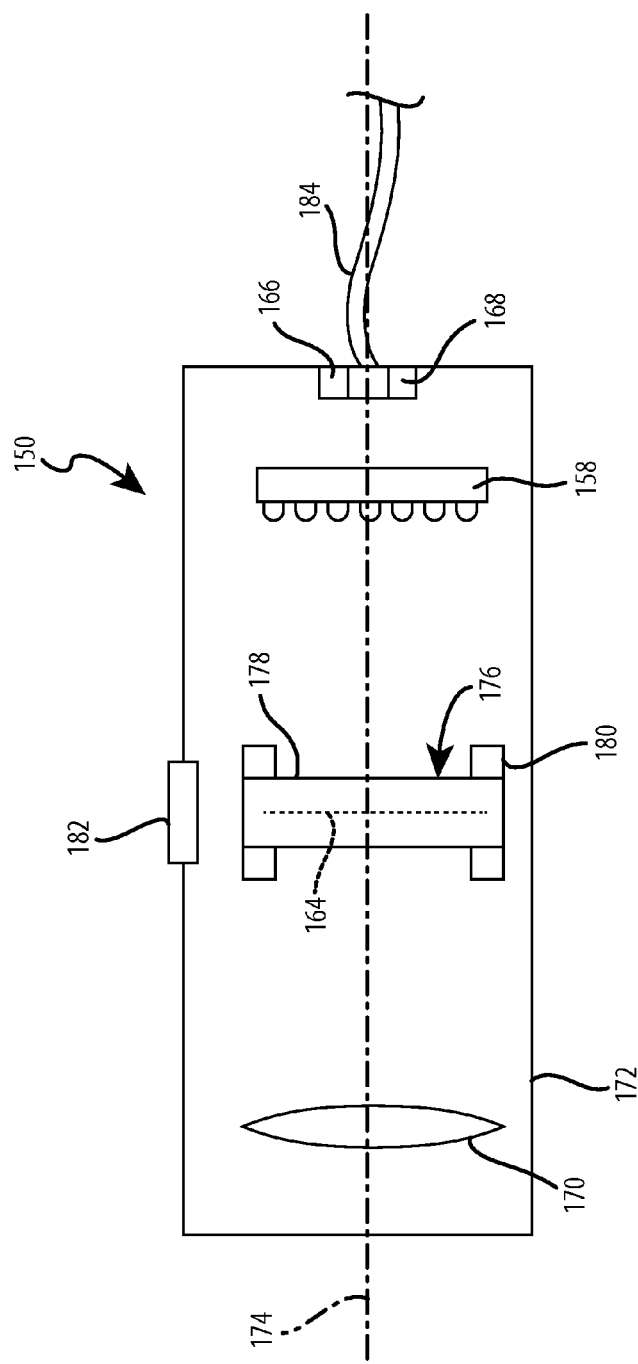
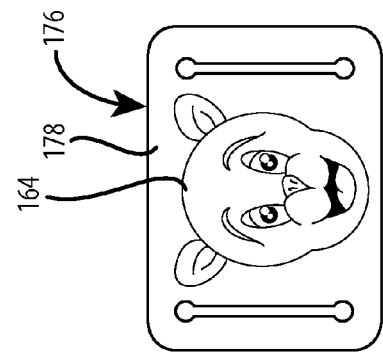

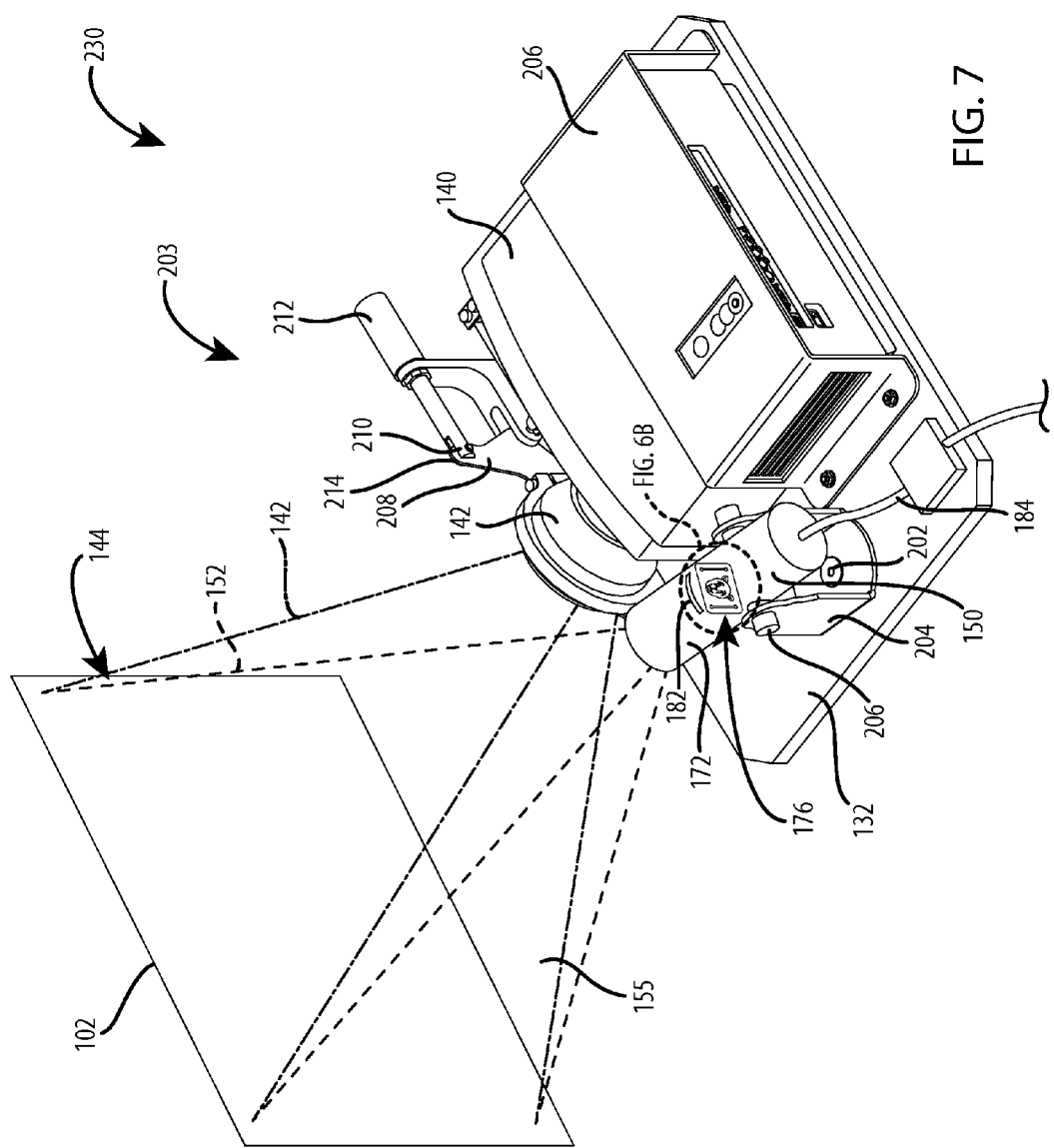

FAIL-SAFE PROJECTION SYSTEM

TECHNICAL FIELD

The technology described herein relates generally to projection systems and more specifically to projection systems having a fail-safe feature.

BACKGROUND

In amusement park rides, integrated audio and visual effects can be implemented to enhance attractions or scenes within the ride. In some applications, head, face, and other components of animatronic figures have been developed that combine one or more projection systems with silicone or other appropriate skin materials to implement animated, still, coordinated, and/or sequential visual effects. U.S. Pat. No. 8,256,904 entitled "Rear Projected Expressive Head" filed on May 23, 2008, and incorporated herein by reference in its entirety, discloses examples of these types of systems. Projection systems also may be implemented to instruct patrons of the amusement parks regarding safety, emergency, or other informational signage.

However, the demand on such projection systems can be high as amusement parks typically operate on strenuous schedules. For example, some amusement parks operate for 365 days a year for fifteen to twenty hours a day. Additionally, the operating environment for these projectors can be harsh since many amusement rides may use changes in environmental conditions to enhance the experience, as well as having thousands of visitors travel through the attractions, both of which can result in dirt, debris, heat, fluids, moisture, and the like, affecting the performance of the projectors. Image and video projectors are usually not designed to operate on such demanding schedules or in such environments and may fail under such conditions. When a projector fails, the entire attraction may have to be shut down to allow the projector or component to be repaired, since the projection may form a main portion of the attraction. In addition to causing components to fail, the dust, dirt, and other particles may accumulate over time on the lens of the projector, causing the projected image to be distorted or occluded, requiring manual intervention to clean and repair the projector.

Further, in attractions or entertainment features having rear-projected faces of animatronic figures, such as those discussed in the above-referenced U.S. Pat. No. 8,256,904, when a projection system fails, the figure may have an undesirable appearance as the skin material may be a blank three dimensional form when not illuminated. Accordingly, in these instances the attraction may have to be shut down to allow either repair of the projector or for a technician to place a mask over the face of the figure.

Patrons to amusement park rides may have limited opportunities to attend amusement parks, so ride and attraction failures, even if brief, can be detrimental to the overall customer experience. Accordingly, there is a need for a reliable, automatic backup system that reduces the need for manual intervention, attraction downtime, and can maintain a desirable experience during failure of a projection system.

SUMMARY

One example of the present disclosure is related to a projection system having at least one main projector, a relief projector, a projection sensor, and a control system. The main projector projects a first image onto the main projection area of a projection surface and the relief projector projects a second image onto a backup projection area of the projection surface, which may be the same as or at least overlap in part with the main projection area. The projection system may include a control system in communication with the projection sensor and the control system activates the relief projector in response to at least one characteristic of the main projector or the main projection area as detected by the sensor.

Another example of the present disclosure includes a projection system having at least one primary projector that when activated projects a first image along a first optical axis onto a projection surface and a secondary projector that when activated projects a second image along a second optical axis onto the projection surface, the second optical axis being substantially aligned with the first optical axis. The projection system may further include a sensor capable of sensing at least one characteristic of the projection surface and a control system in communication with the sensor, where the control system activates the secondary projector in response to the sensor detecting a predetermined fault condition for the at least one characteristic.

Yet another example of the present disclosure is directed to a method of controlling a projection system. The method includes projecting at least one main image onto a projection surface using a main projector, where the main image is a portion of a main program; monitoring a first sensing element, where the first sensing element is configured to sense a characteristic of the projector system and output a detection signal; determining a predetermined fault condition of the sensing element; and controlling the activation of a relief projector in response to a predetermined fault condition. In this example, when a predetermined fault condition is determined, the relief projector is activated to project at least one backup image onto the projection surface and the relief projector projects a backup show having at least one backup image onto the projection surface.

Another example of the present disclosure is direct to a backup control system. The backup control system includes a presentation device for projecting onto a presentation area, a projector, and a controller. The controller includes a processing element and at least one sensor capable of detecting a characteristic of the presentation device or presentation area. The controller activates the projector to project a first image onto the presentation area in response to the at least one sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 6A is a simplified diagram of the relief projector of FIG. 5.

FIG. 6B is a front elevation view of a lens altering assembly for the relief projector of FIG. 5.

FIG. 7 is a perspective view of the fail-safe projection system of FIG. 1.

SPECIFICATION

Overview

Figure 1:
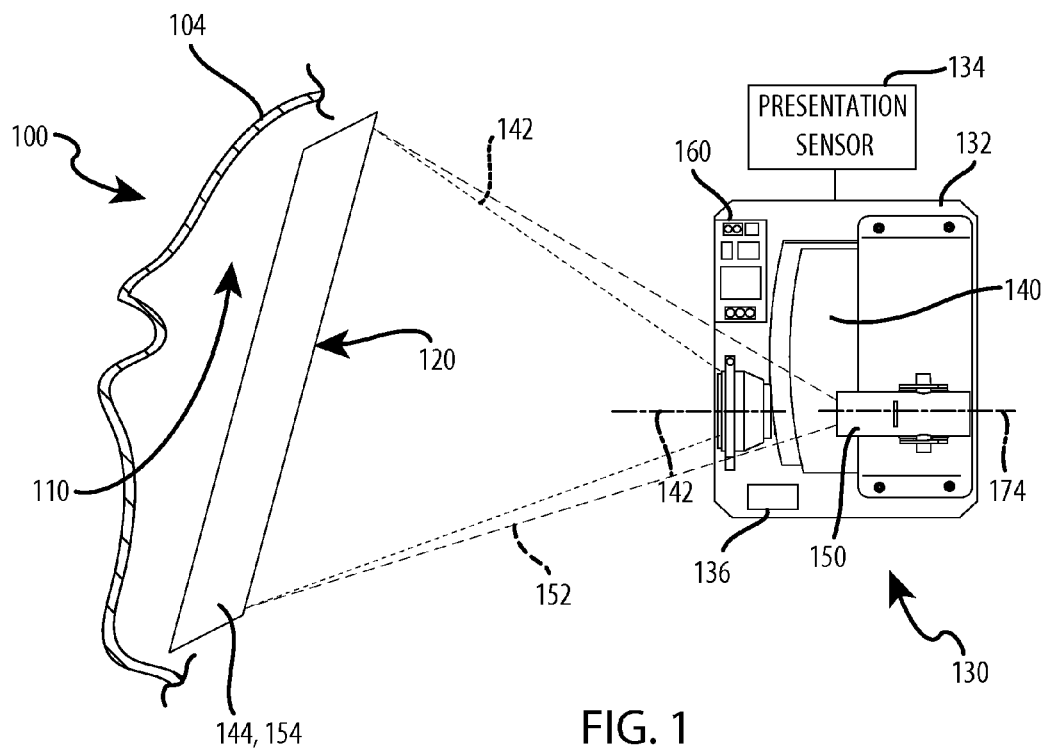
FIG. 1 is right side elevation view of a presentation system with a fail-safe projection system including a relief projector.

The present disclosure is generally related to a presentation system having a backup or relief system enabling the presentation system to continue operating during failure or malfunction of one or more projection components. The presentation system may generally include a main projector, a relief projector, one or more presentation sensors, a controller, and optionally one or more orientation structures that act to secure and position the relief and main projectors relative to one another onto a projection surface.

The main or first projector projects the main content onto the projection surface. The main content is any type of media (e.g., images, video, or the like). The backup or relief projector is selectively activated to project auxiliary content onto the projection surface based on the failure of the main projector or a decrease or variation in image quality of the projected main content. In this manner, the presentation system is able to project content even when one of the projectors experiences a failure, malfunction or degraded performance. The relief projector may be activated during the failure or malfunction of the main projector and/or the relief projector may be activated during periods when the main projector remains operational, but with a reduced output quality or variation from a desired output. As a specific example, the relief projector may be activated when the main projector lens is partially or fully covered by dust, dirt, or the like, such that the projected image of the main projector is attenuated or has a decreased quality. In these examples, the main projector may remain on or may be deactivated when the relief projector is activated. In this manner, the relief projector may operate along with or instead of the primary projector to provide an attractive and presentable display. Stated another way, the projection by the relief projector provides an auxiliary or emergency presentation during failure of the components of the presentation system, obstruction or degradation of the presentation output due to environmental structures and features, building components, or the like.

In many embodiments, the main projector and the relief projector may be configured to project onto the same presentation surface, but in other embodiments, one projector projects an image onto a first surface and another projector projects an image onto a second surface. In these embodiments, the main projector and relief projector may be oriented to have substantially coextensive projection areas and/or fields of view (FOV) to ensure that the projected content of each projector aligns with the projection surface. In some examples, the optical axes of the main projector and relief projector may be substantially aligned. The main projector and relief projector may have image or focal planes that are substantially aligned or that may be radially or angularly offset from one another. To achieve the overlapping, partially aligned, or coextensive relationship of the FOVs, the main projector and relief projector may be in any suitable physical relationship to one another on the chassis (or other support structure) and with respect to each other, such as side-by-side, diagonally, above-below, directed in substantially opposing directions, and so on.

The controller monitors and controls one or more characteristics of the main projector and/or relief projector. The controller may include one or more processing elements and one or more sensing devices or presentation sensors. The one or more presentation sensors may be one or more detectors, thermometers, cameras, incident or ambient light photodetectors, or other suitable devices, configured to detect a state or a characteristic of the main projector or the main projection presentation. As will be discussed in more detail below, in response to the sensor detecting a predetermined fault condition such as the variation of a particular parameter, the controller activates the relief projector to initiate the backup or auxiliary presentation. Examples of predetermined fault conditions include instances when the main projector is off, such as in a power failure, power supply malfunction, lamp failure, or when the main projector is partially malfunctioning, such as the projection having reduced image quality, brightness, video quality, or similar characteristics. Additionally, other predetermined fault conditions may be based on environmental characteristics such as a temperature level or variation, ambient light conditions, sound, noise, or vibrations detected by the sensor. For example, if the sensor detects that the main projector has shut down or that the image of the main projector is obscured (e.g., due to dust on the lens), the controller may activate the relief projector and may optionally deactivate the main projector.

In some embodiments, the controller may check the validity of the predetermined fault condition, i.e., determine whether the predetermined fault condition was actually reached or whether detection of the condition was due to a false reading or error. As one example, when a predetermined fault condition is detected, the controller may determine if the main content is supposed to be turned off or not presented. For example, the controller may determine locally or remotely, relevant information about the main show, such as whether the main show has completed or whether the attraction is closed. If the main show has completed, is not set to be presented, or another similar condition, the controller may determine that the detected condition is false and therefore not activate the relief projector. The condition validation may be used to ensure that the relief projector is not inadvertently activated in instances where a presentation may not be required or the like.

The fail-safe presentation system may be used in a number of different applications. In one example, the fail-safe presentation system may be used within a component of an animatronic figure for an amusement park ride, display, or presentation. In this example, one or more components of the system may be positioned within a hollow space formed by the animatronic figure's head, face, or other desired projection area and may project video or still images onto the interior or rear of the face structure. In these examples, the projector portrays realistic facial features, speech, and other visual effects onto the face of the animatronic character.

In embodiments where the main projector is used to rear-project images onto the face of an animatronic character, the face of the character may be a blank screen to allow the projection images to form the external appearance of the character. Thus, when a component of the main projector fails or malfunctions, the skin or exterior surface may take on an unattractive appearance, which is undesirable for the attraction and can ruin the attraction experience for guests of the amusement park. In conventional applications, when the main projector fails, the attraction may have to be shut down while the projector is repaired or replaced due to the undesirable appearance of the character without a presentation on the projection surface. However, with the fail-safe presentation system, when the main projector malfunctions or fails, the relief projector is activated to project the auxiliary content onto the projection surface, allowing the attraction to continue to operate.

As another example, the presentation system may be used as an automatic backup display that operates in emergency or other situations. In these examples, the presentation system is used as emergency exit signage, menus, or the like.

DETAILED DESCRIPTION

The fail-safe projection system 100 shown in FIG. 1 includes a presentation system 130 and a projection surface 102 onto which the presentation system 130 projects main content and auxiliary content. As shown in FIGS. 1-4, the presentation system 130 includes a main projector 140, a relief projector 150, a controller 160, a presentation sensor 134, and optionally a remote storage and control 138.

Figure 3:
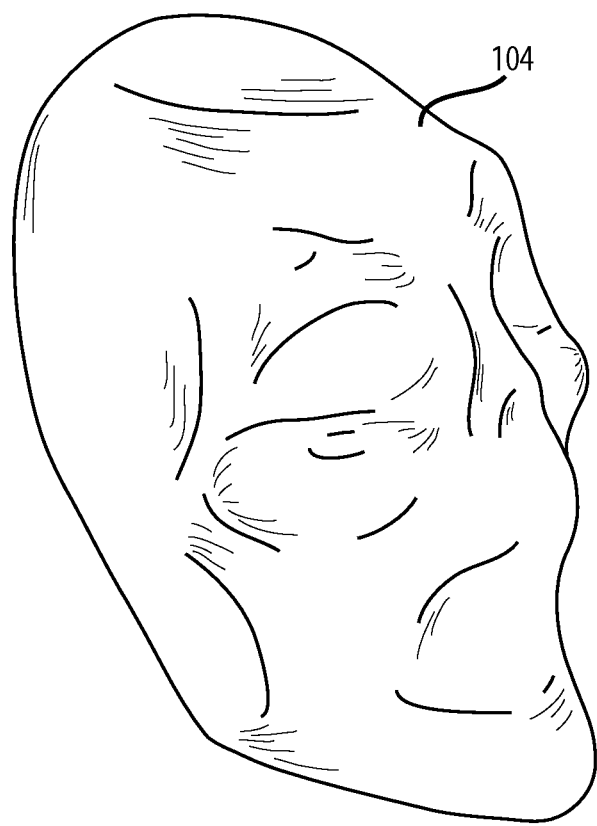
FIG. 3 is an isometric view of a presentation surface for the presentation system of FIG. 1.

With reference to FIGS. 1 and 3, the projection surface 102 comprises substantially any type of surface, including planar, three-dimensional, irregular, textured, colored, blank, or the like. In some embodiments, the projection surface 102 is incorporated into an attraction or three dimensional object, such as an animatronic character or the like, and in these embodiments, the projection surface 102 may be shaped to match a particular portion of the animatronic character or other area. For example, in one embodiment, the projection surface 102 forms the exterior face of an animatronic character and may include a face structure 104 or shape.

As a specific example, the projection surface 102 may be a vacuum formed material, such as thermoplastics, silicone, rubber, plastics, alloys, or the like, shaped or formed into a face form. However, it should be noted that many other shapes and forms of the projection surface 102 may be used. As shown in FIG. 1 the projection system 130 may be positioned within or adjacent a hollow space 110 or interior formed by a face structure 104 or head structure of an animatronic figure (not shown). In instances where the projection surface 102 is non-planar, textured, or varied in color, the image content to be projected from the projection system 130 may need to be modified (e.g., warped, stretched, colored) to compensate for the shape of the projection surface 102. For example, the physical characteristics of the projection surface may be used to modify the content so that the content displays as desired.

The presentation system 130 projects the main content and the auxiliary content onto the projection surface 102, where the projection of either the main content or the auxiliary content is determined based on a number of factors, such as the functioning of the main projector, the projection environment, and the like.

The main projector 140 may be substantially any type of image device or spatial light modulator configured to project light onto the projection surface 102 and in most instances includes optics to focus light onto the projection surface. For example, the main projector 140 may be a video or image projector and depending on the space constraints of the presentation system 100 may be a relatively small form factor, such as a pico or pocket video projector. The main projector 140 may generally include a light source or sources, as well as a projection lens 142 or lens assembly that is used to transmit and focus light emitted from the light source to the projection surface 102.

Additionally, depending on the configuration of the projection system 130, there may be more than one main projector 140, such as a first main projector that projects a first type of content onto a first area of the projection surface 102 and a second main projector that projects a second type of content onto a second area of the projection surface 102.

The presentation sensor 134 may be an external or stand-alone sensor or may be incorporated into the controller 160. In most embodiments, the presentation sensor 134 is in electrical or optical communication with the controller 160. The presentation sensor 134 may be substantially any device capable of detecting a characteristic or state of the projection system 130, such as sound levels, image quality, image color values, image positioning, heat or temperature levels, current intake, vibrations, or the like, and outputting a signal that indicates the detected characteristic. In some examples, the presentation sensor 134 may be a temperature sensor, voltage sensor, light sensor, image sensor, motion sensor, microphone, vibration sensor, electrical or electromagnetic sensor, or the like. The presentation sensor 134 may be digital, analog, electromechanical, or a combination of the above. In some embodiments, the presentation sensor 134 may be configured to detect characteristics of the main content (e.g., color, brightness, or the like) locally or remotely, i.e., at the location of the main projector (such as characteristics of the main projector) or through the system, such whether the video signal feed is being properly received by the main projector.

In one example, the presentation sensor may be able to detect the presence of a video or image signal being transmitted to the main projector. In some examples, the presentation sensor 134 may be configured to determine a characteristic of the main projector 140, such as a temperature of the main projector 140, the intensity of light emitted from the main projector 140, a power level of the main projector 140, a vibration intensity of the projector, a sound level of the projector, or the like. In other examples, the presentation sensor 134 may be configured to detect one or more characteristics of the projection surface or image projected thereon, such as light intensity, image quality, or the like. The system may include one or more types of presentation sensors. For example, a first presentation sensor 134, which may be a discrete sensor, and a second presentation sensor 136, which may be an integrated sensor, may each sense characteristics of the output presentation. In one example, the system may include a local sensor for detecting local characteristics of the main projector (e.g., sound levels, vibration, light levels, or the like) and/or main content characteristics (e.g., image color values, brightness, contrast), and may also include a remote sensor that detects the presence or and/or characteristics of a video/image signal and/or other transmission to the main projector. In this manner, the system may be able to detect failures both locally and remotely to activate the relief projector.

Figure 4:
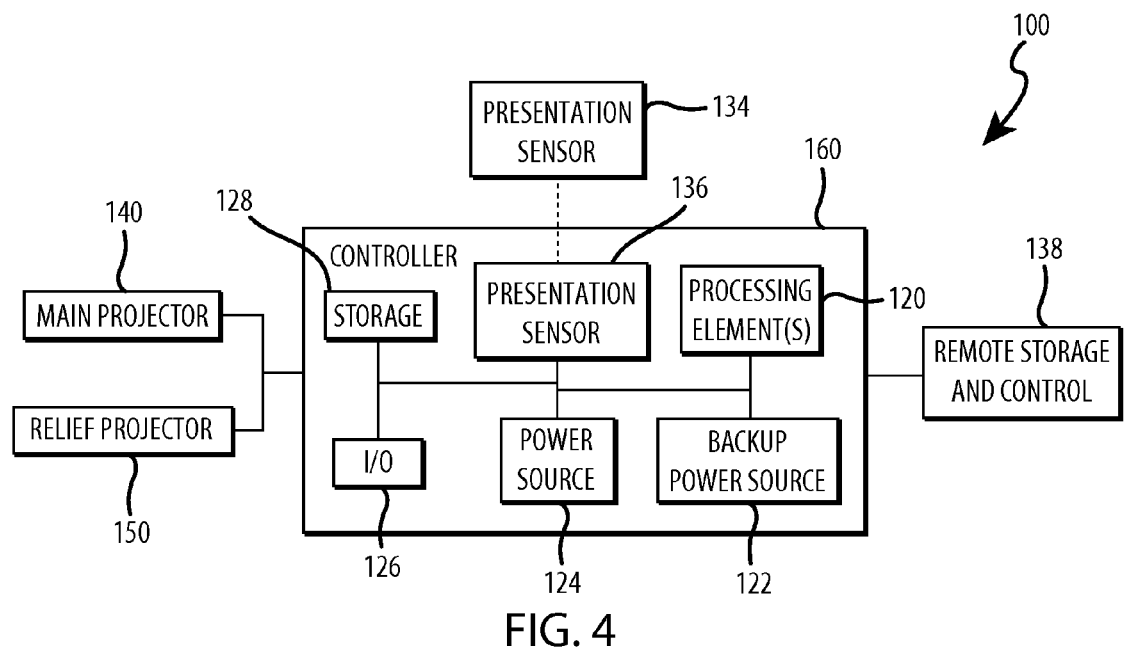
FIG. 4 is a block diagram of the presentation system according to the present disclosure.

With reference to FIG. 4, the controller 160 controls relief projector 150 and/or the main projector 140. The controller 160 is in electrical communication with the two projectors 140, 150, the presentation sensor 134, the remote storage and control 138, and optionally one or more remote or local computing devices. The controller 160 may be substantially any device or group of devices that may receive and execute instructions and serve as a control system for the projection system 130. In some embodiments, the controller 160 may include one or more processing elements 120, a power source 124, an input/output module 126, a storage device 128, and optionally a backup power source 122. Additionally, in some embodiments, the second presentation sensor 136 may be incorporated into the controller 160, i.e., integrated with the controller.

The one or more processing elements 120 may be substantially any type of electronic device capable of processing, receiving, and/or transmitting instructions. For example, the one or more processing elements 120 may be a microprocessor or a microcontroller. Additionally, the one or more processing elements 120 may include a first processor for controlling a first set of components and a second processor for controlling a second set of components, where the first and second processors may or may not be in communication with one another.

The storage device 128 stores media and other content for use by the projection system 130 (e.g. main content for projection by the main projector 140), such as, image files, video files, document files, and so on. The storage device 128 may be, for example, non-volatile storage, a magnetic storage medium, optical storage medium, magneto-optical storage medium, read only memory, random access memory, erasable programmable memory, flash memory, or a combination of one or more types of memory components.

The I/O module 126 receives and transmits data to and from the various components of the controller 120 to other components within the projection system 130 and to each other. For example, the I/O module 126 may transmit data between the presentation sensors 134, 136 and the processing element 130 and may transmit data to one or more computing devices in communication with the controller 160, such as via a universal serial bus connection, radio wave transmission, or the like.

The power source 124 provides power to the controller 160 and the various components of the controller 160 and optionally provides power to the main projector 140 and/or relief projector 150. The power source 124 may be an external power source (e.g., utility-supplied power source, such as 120V power outlet) or may be an internal or independent power source such as a battery, super-capacitor, or the like.

In some embodiments, the controller 160 may include a backup power source 122 that provides power to the controller 160 and various components independent of the power source 124. The backup power source 122 may include a conventional power outlet, an emergency power source (e.g. an emergency power circuit in a building), a battery, a super-capacitor, or the like. In some examples, the backup power source 122 provides power to the projection system 130 in instances where the power source 124 malfunctions or otherwise fails, which allows the controller 160 to function, even in the event of a main power failure.

The projection system 130 may also include the remote storage and control unit 138. The remote storage and control unit 138 may be similar to the storage device 128 of the controller 160 and may be in electrical communication (e.g., via radio wave transmission such as WiFi, Bluetooth, or via current and voltage signals) with one or more components of the projection system 130. In some embodiments, the remote storage and controller 138 may store media and other content for use by the projection system 130. The remote storage and control unit 138 is in communication with the controller 160 by appropriate communication channels, lines, and mechanisms. In some examples, the remote storage and control unit 138 may be coupled to the controller 160 using a wireless communication protocol. Examples of the storage device 138 may include volatile and non-volatile memory, random access memory, one or more hard drives, magnetic tapes, compact discs, Blu-ray, digital video discs, cloud or distributed storage resources, or the like.

Figure 5:
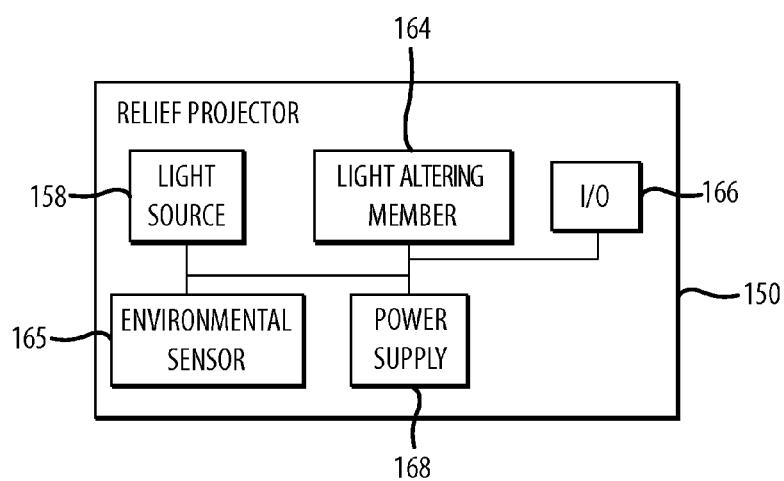
FIG. 5 is a block diagram of a relief projector of the presentation system of FIG. 4.
Figure 8:
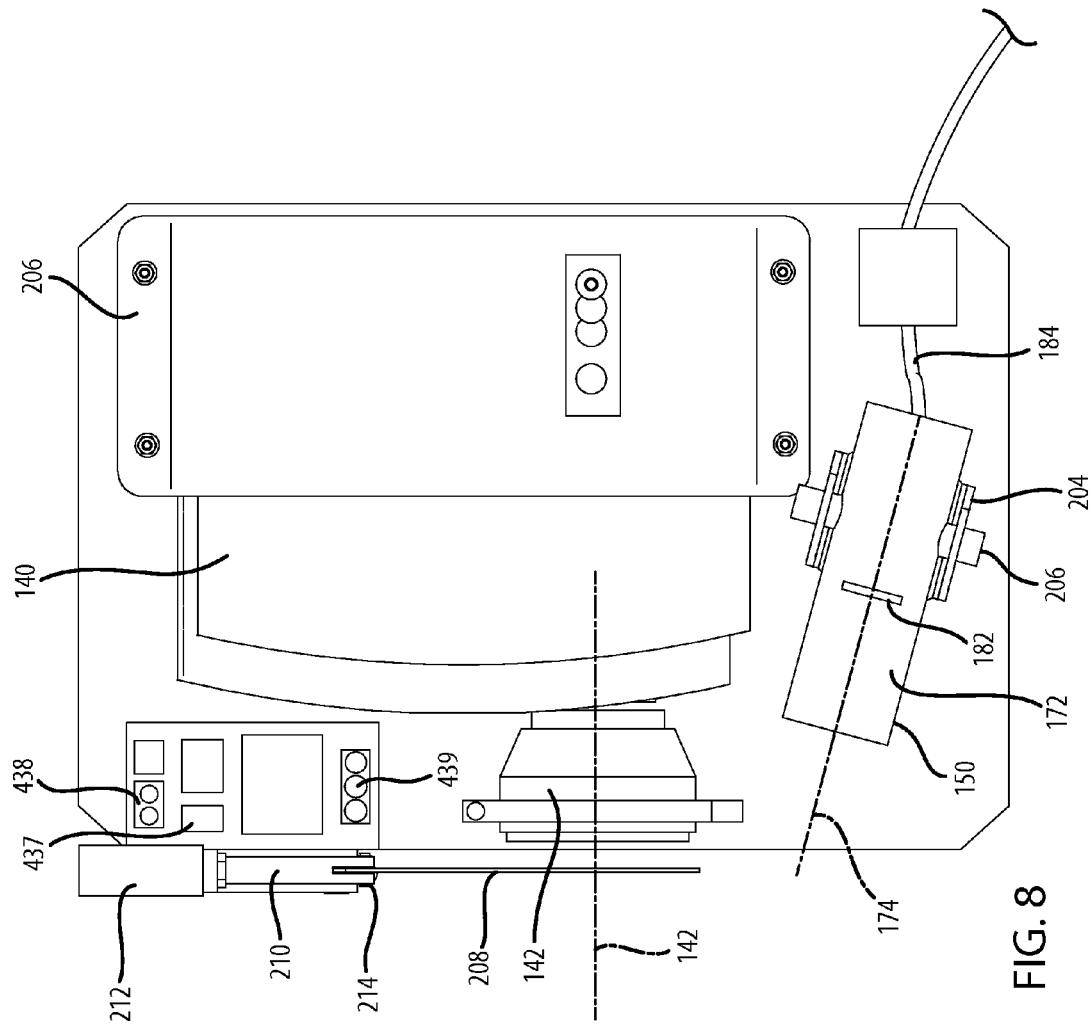
FIG. 8 is a top plan view of the projection system of FIG. 7.
Figure 9:
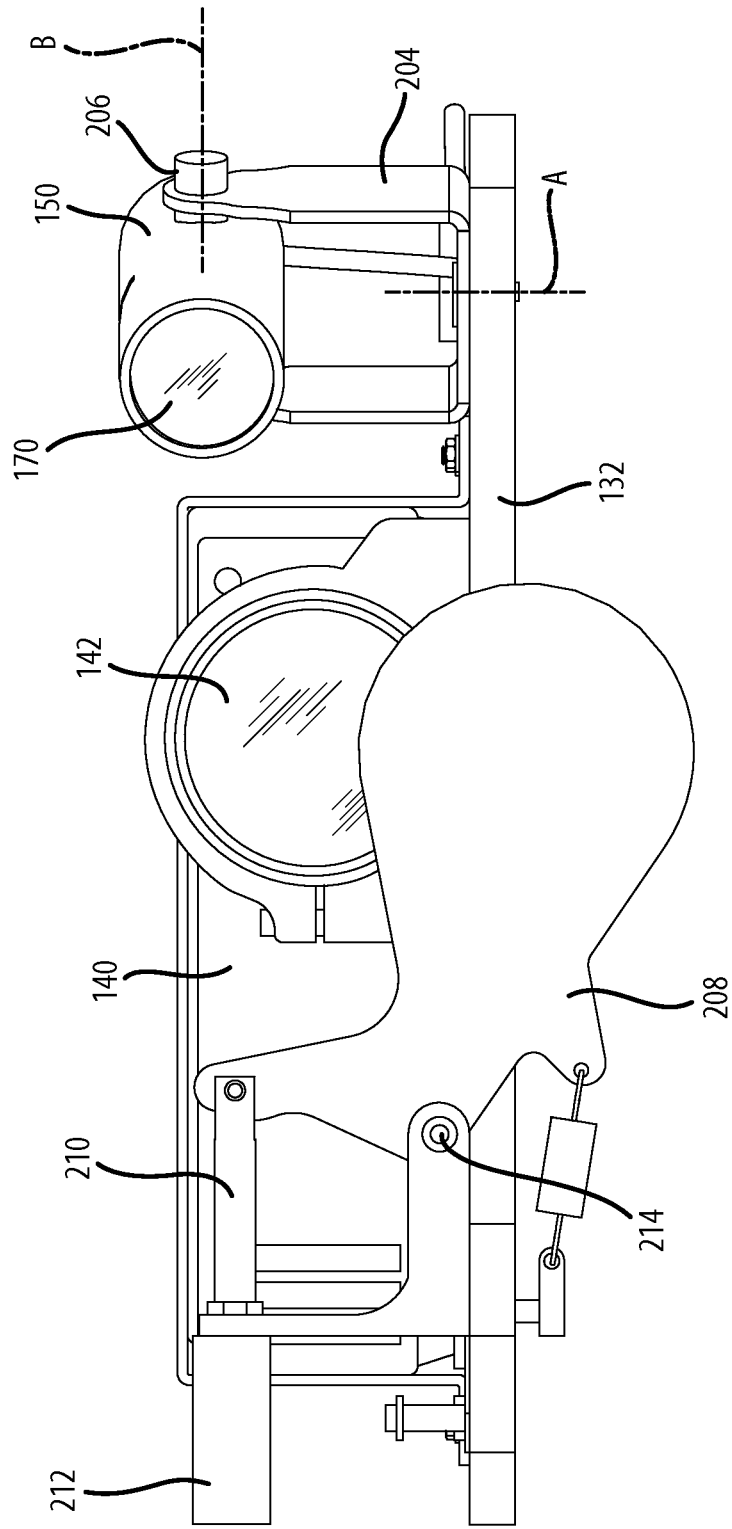
FIG. 9 is a front elevation view of the projection system of FIG. 7.
Figure 10:
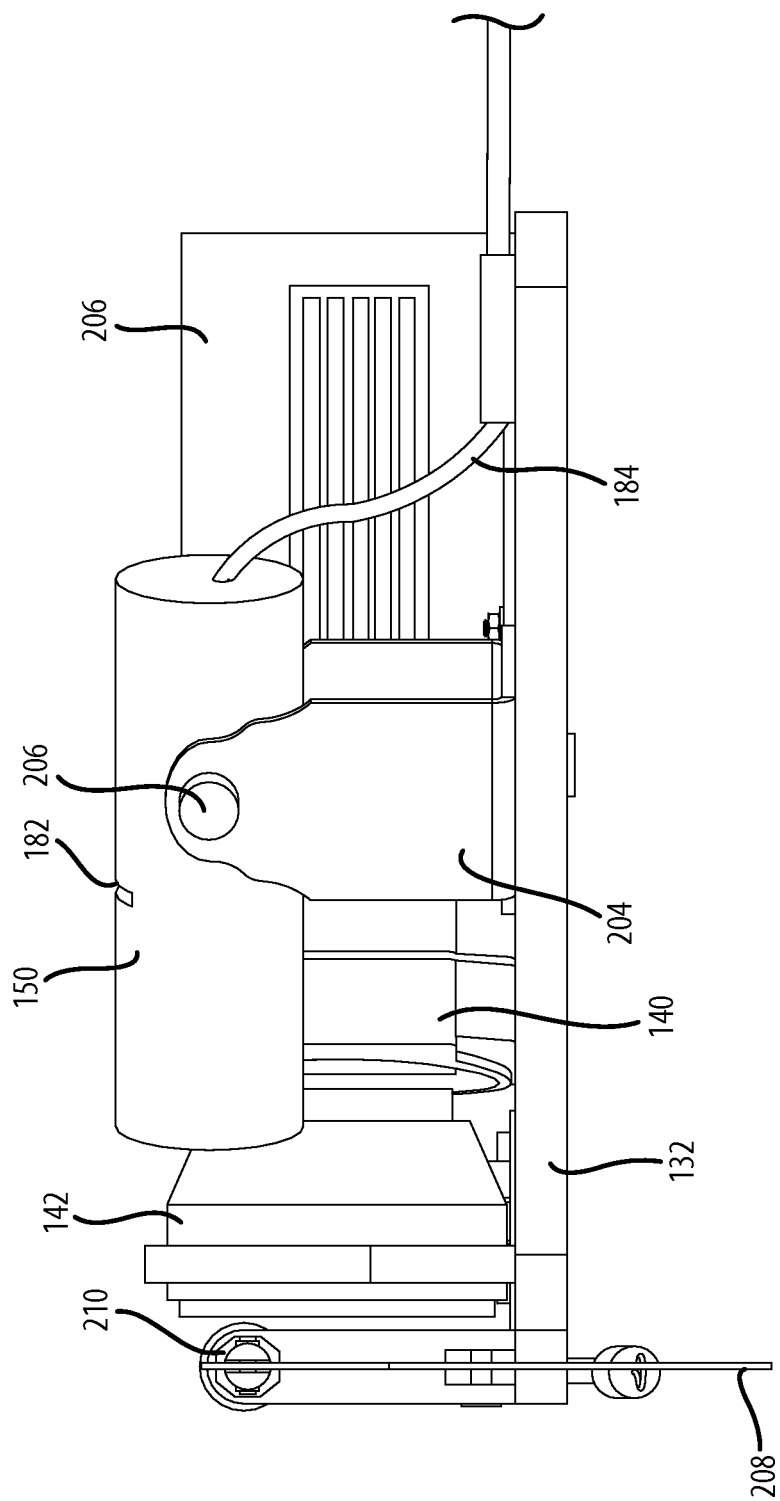
FIG. 10 is a side elevation view of the projection system of FIG. 7.

The relief projector 150 is configured to project auxiliary content onto the projection surface 102. FIG. 5 is a simplified block diagram of the relief projector 150. FIG. 6A is a simplified diagram of the relief projector 150. FIG. 6B is a front elevation view of the light altering assembly for the relief projector 150. With reference to FIGS. 5 and 6A, the relief projector 150 may be similar to the main projector 140 and may be substantially any type of optical device that projects light onto the projection surface 102 (or a portion thereof). In some embodiments, the relief projector 150 is configured to be somewhat smaller and more robust than the main projector 140, but may lack certain features, such as an expanded color gamut or resolution, as compared to the main projector 140. For example, the relief projector 150 may be a light source with a physical light-altering member placed between the light source and the projection surface 102 to create a desired image.

In some embodiments, the relief projector may be a light emitting diode (LED) lighting fixture, such as a Gantom IQ Fixture. In these embodiments, the relief projector 150 may be sufficiently small, such as about 1 to 4 inches in diameter and about 2 to 6 inches long to allow the relief projector to be positioned within a small space and often positioned adjacent to the main projector 140. For example, the relief projector 150 and the main projector 140 may both be positioned within the head of an animatronic character.

Although the relief projector 150 could be a projector substantially similar to the main projector 140 that could project content substantially the same as the main content, the space required for this configuration may be too large for many applications or projection areas. This is important to consider since the FOV 152 or optical axis of the relief projector should be aligned so as to generally match the FOV 152 or optical axis of the main projector, which is exceedingly more difficult as the size and complexity of the relief projector increases.

The alignment of the optical axes of the main projector 140 and the relief projector 150 becomes more important as the shape, texture, and/or color of the projection surface 102 varies, since the auxiliary and main content, although different, may be configured to project similar features or characteristics onto the same areas of the projection surface 102. For example, in instances where the projection surface 102 forms a character's face or other body component, both the main content and the auxiliary content may include a portion that is configured to be projected on a nose area and thus it may be desirable to have a similar projection angle for both sets of content. Finally, the robustness and related characteristics of the relief projector may also be desired to achieve a somewhat automatic and substantially immediate activation of the auxiliary content. Often, the main projectors 140, while having certain desirable characteristics, such as improved resolution, hue projection, brightness, etc., may require a period of "warm-up" time before an image may be projected, which in some devices may be sufficiently long that guests realize that the attraction is not operating properly.

The relief projector 150 may include a light source 158, a light altering assembly 176 including a light-altering member 164, a lens 170, an input/output (I/O) module 166, a power supply 168, and a communications line 184. Each of the components for the relief projector 150 may be contained or connected within a housing 172, which may include an access door 182 to allow access to one or more components of the relief projector 150, such as to the light altering assembly 176.

The light source 158 of the relief projector 150 may be substantially any type of light emitting element, such as, but not limited to, a light emitting diode (LED), incandescent bulb, fluorescent bulb, halogen bulb, or the like, and may be collimated, scattered, coherent, focused, or unfocused, or a combination thereof. The light source 158 is configured to direct or project light towards the projection surface 102 and may project light generally along an optical axis 152 (see FIG. 2), determined by the physical characteristics of the relief projector 150 and its positioning relative to the projection surface 102. The lens 170 focuses the light emitted from the light source 158 onto the projection surface 102.

The I/O module 166 receives and transmits various control and power signals to the relief projector 150, such as via the communication line 184 or wireless means. The power supply 168 provides power to the light source 158 and other components of the relief projector 150. The power supply 168 may be hardwired to an external power source (e.g., wall outlet connected to the communications line 184) and/or may be a portable or an independent power source, such as a battery, super capacitor, power circuit, or the like. In many embodiments, the power supply 168 may be independent from a power source for the main projector 140, such that if the power supply 168 for the main projector 140 fails or malfunctions, the relief projector 150 can still receive power.

With reference to FIGS. 6A and 6B, the light altering assembly 176 includes the light-altering member 164, a frame 178 for securing the light-altering member 164 in the housing 172, and a support 180 for anchoring the frame 178 in the housing 172. The frame 178 may be configured to orient and/or align the light-altering member 164 with respect to the optical axis 174 of the relief projector 150. In some examples, the frame 178 may be configured to enable reversible and rotatable mounting of the light-altering member 164 relative to the light source 158. The access door 182 is shown in FIG. 6A as being defined through a top surface of the housing 172, however, in other embodiments the access door 182 may be defined in other locations on or within the relief projector 150. Furthermore, the relief projector 150 may include more than one access door 182, that allows multiple light alternating members to be used to create a combined light output, such stacking two or more stencils together. It should be noted that one or more of the components, such as the frame 178 and support 180 may be omitted or modified as desired based on the structure and configuration of the relief projector 150.

The light-altering member 164 may be substantially any device that alters the light emitted from the light source 158, such that the light source 158 emits a first light pattern and the light-altering member 164 modifies the pattern to create a second pattern on the projection surface 102. In some embodiments, the light-altering member 164 may be integrated with the relief projector 150 and in other embodiments the light-altering member 164 may be external to or otherwise connected therewith. Additionally, the light altering member may be aligned to correspond with the optical axis of the light source, may be reversibly aligned with the optical axis of the light source, or may be positioned at some angle relative thereto.

The light-altering member 164 may be a photographic slide, screen, optical filter, or the like that may be positioned between the light source 158 and the projection surface 102. For example, the light-altering member 164 may be a "go-between" or "gobo" element, such as a gobo slide or gobo wheel. The materials and forming process for the light-altering member 164 may be varied as desired Some examples of the light alerting member include an ink-printed, emulsion-printed, or dye-printed slide, an exposed film slide, a transparency slide, an etched slide glass or plastic material, dichroic glass, or the like. In some examples, more than one light-altering member 164 may be used, e.g., two or more light-altering members 164 may be positioned on a reel or a wheel and selectively positioned in front of the light source 158 and the projection surface 102. It should be noted that in some instances, the light altering member 164 may have a relatively small size, e.g., approximately 0.5-1.5 inches and the resolution of the relief projector 150 may need to be adjusted, increased, decreased, or otherwise compensated to ensure that the projected image is displayed as desired.

In one embodiment, the light-altering member 164 may be inserted into the frame 178 via the access door 182, which allows a user to change or modify the light-altering member 164 as desired, such as to change the auxiliary content from a first content to a second content. The light-altering member 164 may be aligned with the light source 158 and lens 170 such that an optical axis 174 of the relief projector 150 extends along approximately a centerline of the lens 170, light-altering member 164, and light source 158.

In some embodiments, the light source 158, which may be one or more LEDs or other light producing elements, may be modified to adjust to environmental factors, such as the ambient lighting of the projection surface 102, the color or texture of the projection surface, or the like. For example, the intensity may be changed to account for ambient lighting. In one particular example, the relief projector 150 may include an environmental sensor 165 that detects changes in the environment or the like and adjusts characteristics of the projector 150. For example, an ambient light sensor may be used to adjust the light intensity of the light source 158, e.g., the sensor may detect characteristics of the environment and a voltage regulator may be used to reduce the brightness of the light source 158 for the relief projector 150.

With reference again to FIG. 1, in some embodiments, one or more components of the projection system 130 may be connected to or secured on a chassis 132. The chassis 132 or orientation structure secures various components of the projection system 130 in a desired orientation and position. In the example, of FIGS. 1 and 2, the main projector 140 is secured to the chassis 132 and the relief projector 150 is positioned on top of the main projector 140. In this example, the optical axis 174 of the relief projector 150 is parallel to the optical axis 146 of the main projector 140 such that images projected from both projectors 140, 150 will be aligned with similar areas of the projection surface 102. The chassis thus helps to align the projection components as desired to create the desired alignment between the FOVs. In some embodiments, the projection area of both projectors 140, 150 may be substantially the same. However, in other embodiments the projection area for each projector 140, 150 may differ. For example, with reference to FIGS. 1-3, the main projector 140 may have a first FOV 142 that may be somewhat wider than a second FOV 152 of the relief projector such that the main projector 140 may project onto a first projection area 144 and the relief projector 150 may project onto a second projection area 154, that may fall within the first or the main projection area 144.

In examples where the relief projector 150 is a LED light fixture, the projection area and optical axis may extend relatively straight from a central axis of the lens, whereas in some embodiments the projection FOV and optical axis of the main projector 140 may be somewhat angled or non-planar. In these examples, the FOV of the relief projector 150 may be aligned with the FOV of the main projector 140 without requiring substantial physical lens alignment. However, in other embodiments, more or less physical alignment of the lens and optical axes may be required or desired.

Other projection area configurations are envisioned. For example, in some embodiments, the relief projector 150 and main projector 140 may project onto different sides of the projection surface 102 (see, e.g., FIG. 13). Additionally, in some examples, the main projector 140 and relief projector 150 may be mounted separately from one another (e.g., on different chasses) or otherwise mounted within the projection system 100 using appropriate mounting means (e.g. mounting to a ceiling, wall, floor, object, and the like; not shown). In embodiments where the relief projector 150 is configured to project onto the same side of the projection surface 102 as the main projector 140, the relief projector 150 is typically positioned on the same side of the projection surface 102 as the main projector 140. However, in other embodiments, the relief projector 150 may be oriented on the opposite side of the projection surface 102 from the main projector 140 such that the auxiliary content may be projected onto a different side of the projection surface 102 from the main content.

Figure 2:
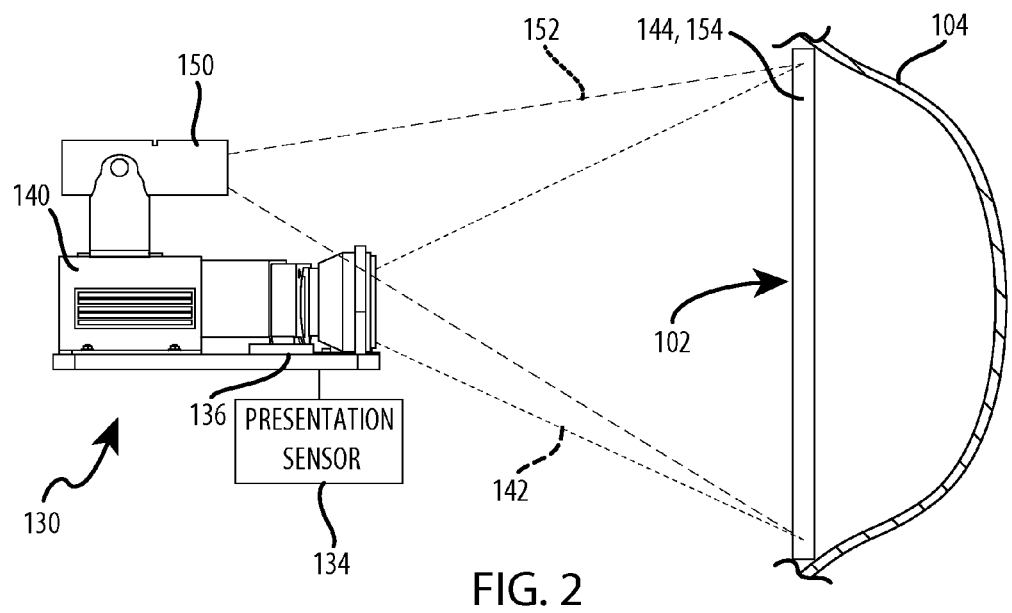
FIG. 2 is a top plan view of the presentation system of FIG. 1.

In another example, the relief projector 150 and the main projector 140 may be horizontally adjacent to one another, rather than vertically adjacent as shown in FIGS. 1-3. FIGS. 7-10 illustrate various views of another example of a projection system 230. The projection system 230 may be substantially similar to the projection system 130 of FIGS. 1-2, but the relief projector 150 may be positioned adjacent to the main projector 140 and both projectors 140, 150 may be secured to the chassis 132. In these examples, the chassis 132 physically orients the main projector 140 and relief projector 150 with respect to each other and to the projection surface 102. In some examples, the relief projector 150 may be positioned to the left or right of the main projector 140.

In some embodiments, the projection system 230 may include securing brackets or mounts that secure the projectors 140, 150 to the chassis 132. For example, a projector bracket 206 may be used to secure the main projector 140 to the chassis 132 and a relief projector mount 204 may be used to secure the relief projector 150 to the chassis 132. In this example, one or both of the mounts/brackets may be adjustable to allow a user to adjust the positioning of the projectors 140, 150 relative to each other. For example, the relief projector mount 204 may include a pivot 202 or other component that allows the mount 204 to be selectively rotated to change the direction of the relief projector 150. The pivot 202 enables the relief projector 150 to rotate around an axis A (see FIG. 9). The mount 204 may further have a set of adjustments knobs 206 that enable the relief projector 150 to rotate around an axis B (see FIG. 9). The pivot 202 and the adjustment knobs 206 allow a user to orient the relief projector 150 as desired to ensure that the projection area 155 of the relief projector 150 substantially aligns with the projection area 144 of the main projector 140.

Projectors 140, 150 may be oriented such that the optical axis 146 of the main projector 140 substantially aligns with the optical axis 156 of the relief projector 150 such that the FOV 152 of the main projector 140 is substantially the same as the FOV 152 of the relief projector 150. Furthermore, the relief projector 150 may be positioned and oriented such that the projection area 154 of the relief projector 150 substantially overlaps or aligns with the projection area 144 of the main projector 140. Accordingly, the second image projected by the relief projector 150 may substantially overlap or align with the first image projected by the main projector 140.

In the embodiments shown in FIGS. 7-10 the projection system 230 may also include a shutter assembly 203 for selectively covering and uncovering the lens 142 of the main projector 140. The shutter assembly 203 may include a main projector shutter 208, a shutter motor 212, shutter linkage 210, and pivot 214. The shutter 208 is configured to fit over and/or around the lens 142 of the main projector 140 to block light transmitted by the lens 142 from reaching the projection surface 102.

The shutter motor 212 selectively moves the shutter 208 from a first or unblocked positioned exposing the lens 142 to a second or blocked position covering the lens 142. The shutter motor 212 may be coupled to the shutter 208 by a shutter linkage 210 and pivot 214. When the main projector 140 is not in use or when the main projector 140 has failed or is otherwise malfunctioning, the shutter assembly 203 may be activated to move the shutter 208 into the first position to protect the main projector lens 104 and/or to prevent unwanted projection of an image or other information from the main projector 104.

Operation of the Fail-Safe Projection System

Figure 11:
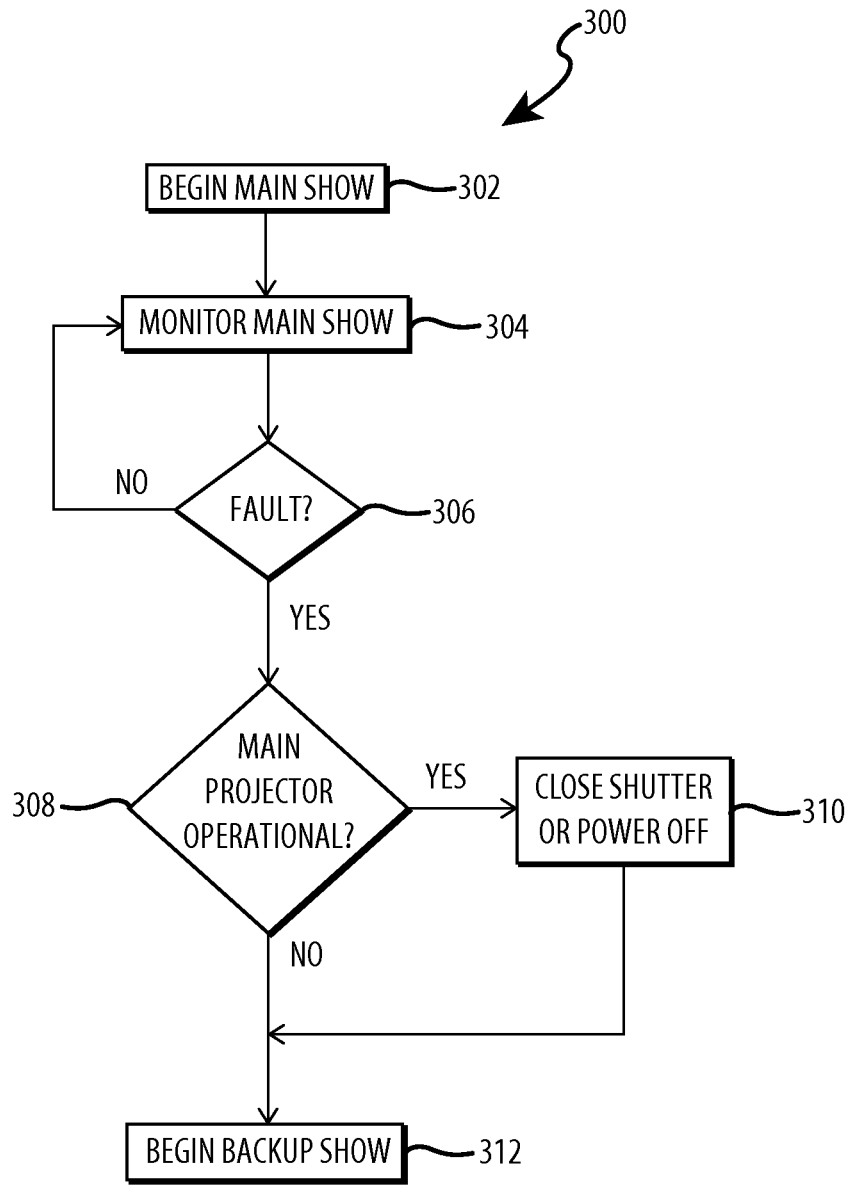
FIG. 11 is a flow chart for a method for selectively activating auxiliary content using the fail-safe presentation system of FIG. 1.

FIG. 11 is a flow chart illustrating using the fail-safe presentation system 100. Method 300 includes operation 304 where the main projector 140 projects the main content to begin the main presentation. In one embodiment, the content may be provided to the main projector 140 from the remote storage 138. Alternatively or additionally, the main content may be stored on the main projector 140 or the storage device 128 of the controller 160. As the main projector 140 is activated in operation 304, light from the main projector 140 is transmitted through the lens 142 to the projection surface 102.

In operation 306, one or both of the presentation sensors 134, 136 monitor the main show to determine if a fault occurs. In operation 308 the controller 160 determines whether a fault is detected. For example, the controller 160 detects signals from the presentation sensors 134, 136 to detect changes in the presentation characteristics of the main show, either due to component failure of the main projector 140 and/or environmental factors. Illustrative presentation characteristics include projection intensity, image hue, image brightness, video or image quality, ambient light intensity, vibration, temperature, or the like.

In operation 308 the controller 160 compares signals from the presentation sensors 134, 136 to a threshold, baseline, or predetermined value to determine whether there is a variation from the predetermined value, increase of the threshold, or the like. If there is a variation from the threshold or predetermined value, the controller 160 may determine that a fault has occurred and if the signal falls within a predetermined range or is below a threshold value, the controller 160 may determine that no fault has occurred. For example, if the temperature increases past a predetermined value (e.g., an operational temperature for the projector), a fault may be determined. As another example, the main projector 140 may create a certain level of vibrations while running, such as due to operations of internal components (e.g., fans, etc.) and so when the vibrations of the main projector 140 drop below a certain amount, the controller 160 may determine that the main projector 140 has ceased operating. As yet another example, the projected main content may have a predetermined brightness or hue value and as one of those characteristics change, such as a reduction in brightness or a discoloration in hue, the controller 160 may determine that dust or dirt is covering the lens 142 and affecting the output of the main projector 140.

While a fault is not detected in operation 308, operation 306 continues to monitor the presentation characteristics of the main content. When a fault is detected in operation 308 the controller 160 determines whether the main projector 140 is still operational in operation 309. When the main projector 140 remains operational, for example, if, the fault is due to an environmental factor, such as dust on the lens 142 or the like, in operation 311, the controller 160 either closes the shutter 208 or powers off the main projector 140. Operation 311 ensures that the main content and the auxiliary content are not projected onto the projection surface 102 at the same time and prevents the main content from interfering with the auxiliary content in the event at the main projector 140 is still functioning or is unable to be shutoff.

After a fault is detected in operation 310 the relief projector 150 is activated using, for example, controller 160. As the relief projector 150 is activated, the auxiliary content or backup presentation is projected onto the projection surface 102. Optionally in operation 310 the controller 160 may send a signal indicating the failure of the main show. For example, the controller 160 may send a notification (e.g., email, text message) to one or more users or computing devices indicating the failure and the detected presentation characteristic causing or related to the failure.

Figure 12:
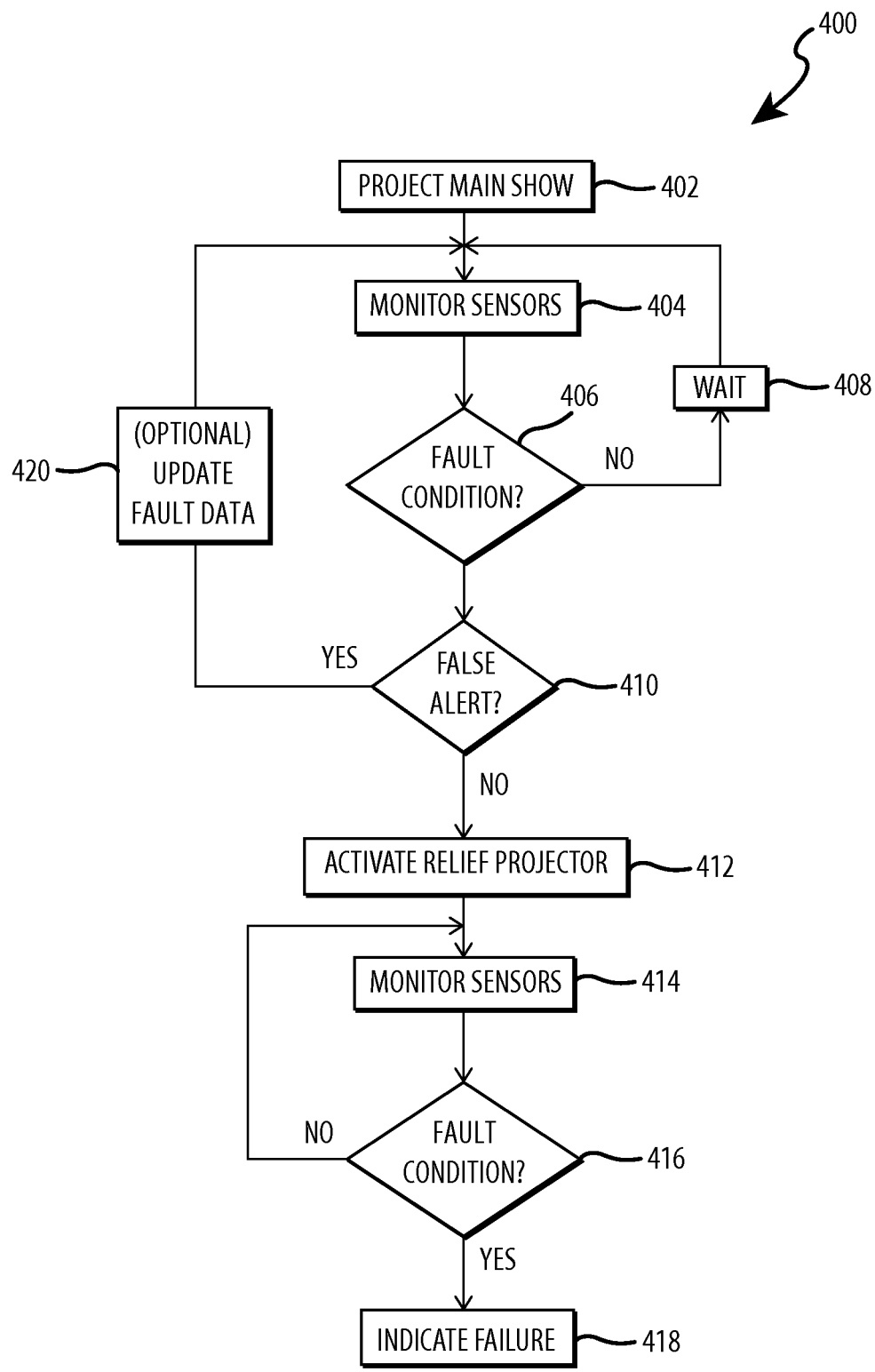
FIG. 12 is a flow chart of another example of a method for selectively activating auxiliary content using the fail-safe presentation system of FIG. 1.

In some embodiments, the fail-safe presentation system 100 may be configured to discern false fault readings from actual fault readings. FIG. 12 is a flowchart illustrating a method 400 of operating the fail-safe presentation system 100 that screens or detects false fault indications. In operation 402 the main projector 140 projects the main show onto the projection surface 102. In operation 404, the controller 160 monitors one or both of the presentation sensors 134, 136 to detect one or more changes in the output presentation of the main show.

In operation 406 the controller 160 determines whether a predetermined fault condition has been reached. For example, whether one of the characteristics of the main show has been varied from a predetermined level or parameter and whether that variation has reached a predetermined level or parameter. A predetermined fault condition is determined based on the kind of presentation sensors 134, 136 being used, and may include more than one condition for a given sensor. For instance, in embodiments where one of the presentation sensors 134, 136 is a temperature sensor, the predetermined fault condition may be based upon a pre-set temperature which may indicate that a main projector 140 or other component has malfunctioned, or may be a condition where a temperature has risen or fallen at a certain rate with time. In other examples, if one of the presentation sensors 134, 136 is a photo-detecting sensor, the predetermined fault condition may be based upon a preset value for the intensity, polarization, color, or quality of light. Furthermore, in some examples the presentation sensor 134, 136 may be a camera or other image capturing device capable of analyzing a characteristic of the main projector 140, the projection surface 120 with the content projected thereon, such as a quality of a first image or second image.

In some examples, the predetermined fault condition may be a predetermined value indicating a failure or malfunction. In other examples, the predetermined fault condition may be a predetermined value that if the output signal of the presentation sensor 134, 136 falls below indicates a failure or malfunction. In still other examples, the predetermined fault condition may be a range of values and the predetermined fault condition arises when an output signal or output voltage is outside or inside of the range of values. In other examples, the signal may be monitored over time to determine a threshold change or acceleration of the sensor signal. Accordingly, the predetermined fault condition is one that is selected to indicate when a failure or malfunction of a projector or a projection system component is occurring. The presentation sensors 134, 136 may be configured to sense a variety of parameters and the predetermined fault condition for each parameter sensed may be different from each other.

While the predetermined fault condition indicates a fault the system 100 may wait in operation 408 for a predetermined amount of time before returning to operation 404. The wait time provides the system a chance to wait for the time cycle before reanalyzing the sensors, giving the sensors a chance to update the data. However, in other embodiments, operation 408 may be omitted and the method 400 may return directly to operation 404 and continue to monitor the presentation sensors 134, 126.

When the predetermined fault condition has occurred, operation 410 determines whether the fault condition is a false alert. For example, in some instances, the failure of the main show to be projected or the variation in the main show may be on purpose, e.g., the attraction is closed and a presentation is not needed. In these instances, the predetermined fault condition may be a false reading. To determine whether the predetermined fault condition is a false alert, the controller 160 may analyze one or more conditions of the main show and/or main projector 140, for example, whether the main show is supposed to be projected at the current time, whether there have been any variations in the main show (such as changes in image quality, image hues, or the like) that may not have been updated to the sensors 134, 136 or controller. In other words, during operation 410, the controller 160 may determine whether the threshold baseline or range used to analyze the sensor output needs to be modified or updated.

The controller 160 may determine in operation 410 whether the presentation sensors 134, 136 have failed, malfunctioned, or produced an erroneous reading. For example, the controller 160 may compare a reading from one of the presentation sensors 134, 136 to determine if the other of the presentation sensors is operating correctly.

When a false alert is determined in operation 410, the method 400 may return to operation 404 and continue to monitor the presentation sensors 134, 136. Optionally, in operation 411 the system 100 updates the fault data if required (e.g., update the threshold levels or ranges based on new information regarding the output parameters of the main show).

When a false alert is not detected in operation 410 the relief projector 150 is activated in operation 412, which projects the auxiliary content. Optionally, operation 412 may also deactivate the main projector 140 to ensure that the content from each of the projectors does not overlap.

In operation 414, the system continues to monitor the projected content, in this case the presentation sensors 134, 136 may detect whether the auxiliary content is projecting as desired. Operation 416 may be substantially the same as operation 406, but may be analyzed with respect to the auxiliary content and the relief projector 150 rather than the main content and the main projector 140.

While a predetermined fault condition is not reached the method 400 may return to operation 414 and may continue to monitor the presentation sensors 134, 136. When a predetermined fault condition has been reached in operation 416, the controller 160 may indicate there has been a failure or malfunction in the presentation system in operation 418. For example, in operation 418 the controller 160 may send an error message to one or more computing devices, users or the like to indicate that both the main projector 140 and the relief projector 150 may no longer be operating correctly. As one example, the controller 160 may indicate failure by transmitting a signal to the remote storage and control unit 160, by an indicator such as a light or display, emitting a sound, or the like, so that inspection and/or repair can be arranged. The failure indication helps to alert the proper users so that the attraction can be closed if required and that the components can be repaired or replaced.

Additional Embodiments

The fail-safe presentation system 100 may be used in a number of different applications where projector failure may occur or where failure of a projector may have adverse effects. For example, the presentation system 100 may be used in signage applications, such as for informational, promotional, or emergency signage. Signs provide emergency information (e.g., exit information) and in the event of a light source failing certain signs may not be easily viewed, such as in dark environments like movie theaters and guests may become confused or frustrated. Further, in the event of an emergency, a guest may be in danger if they are unable to locate an exit due to a projector or signage failure. The fail-safe presentation system may be used to activate auxiliary information for the signage in the event of a power failure or other signage failure. In another example, a display fixture may present entertainment content during normal operation and during a power failure or other emergent condition, fail over to emergency instruction or exit information.

Figure 13:
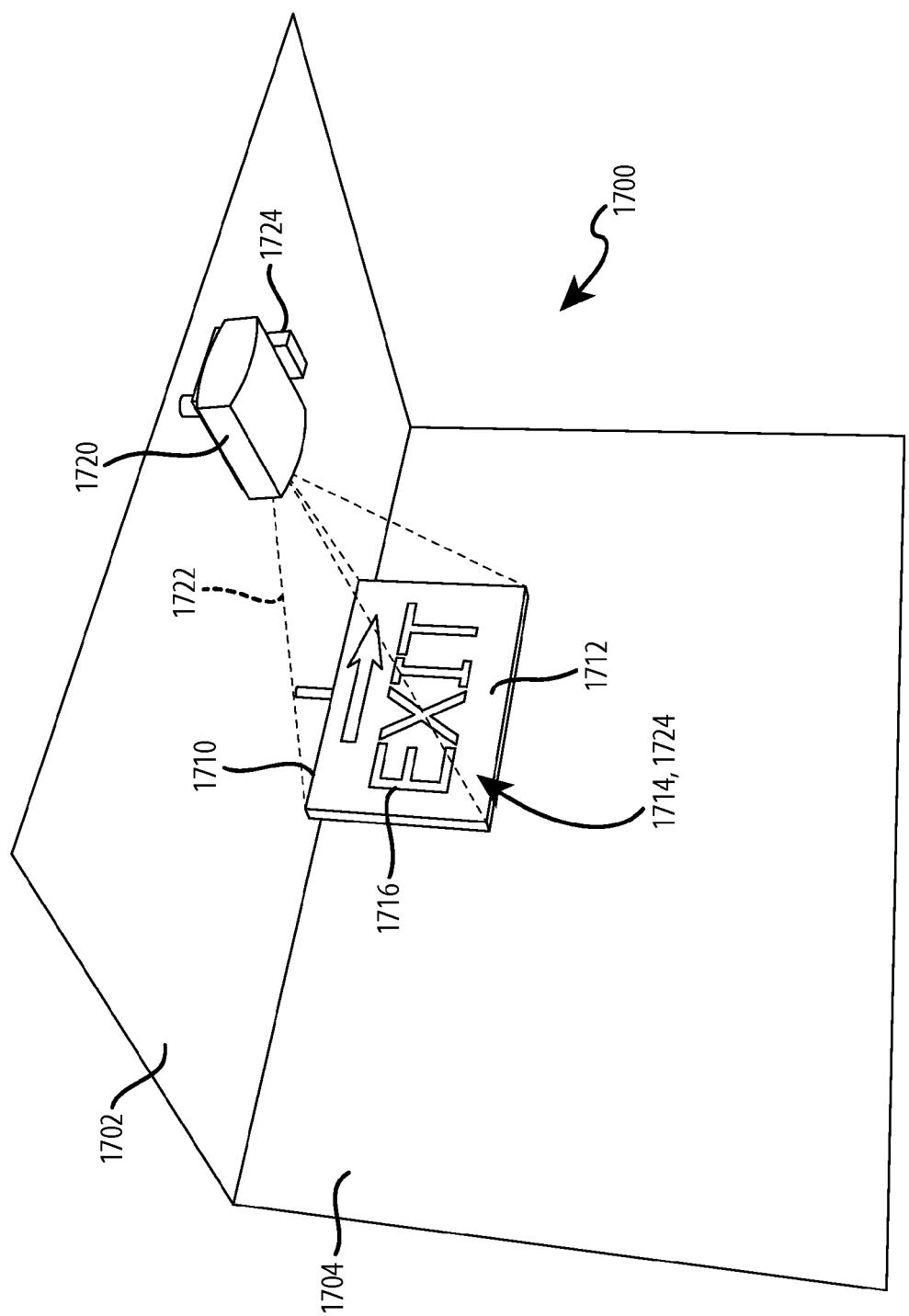
FIG. 13 is perspective view of another example of a fail-safe presentation system.

FIG. 13 is a perspective view of a presentation system 1700 used for signage. With reference to FIG. 13, the presentation system 1700 includes a backup projection system for use in informational signage. The presentation system 1700 may include a sign 1710 defining a projection surface 1712, a presentation sensor 1724, and a relief projector 1750. In this example, the sign 1710 may be mounted to a wall, ceiling, or other support structure and may be internally or externally illuminated by a light source such as incandescent bulbs, light emitting diodes, and the like. The sign 1710 may include information 1716 displayed thereon, such as, but not limited to, exit information, menu information, office signage, directional information, location information, or the like. The type of information 1716 may be varied as desired. The information may be illuminated by the external/internal lighting or may be defined by a projected image or images that are projected by a projector onto the sign 1710.

The presentation sensor 1724 may be substantially the same as the presentation sensors 134, 136. The presentation sensor 1724 is configured to detect a change in the signage information, which may be due to failure of the lighting or the image projection. The change may also be associated with a detected emergent condition such as a fire, earthquake, storm warning and the like. In such a situation, the relief projector 1750 might display evacuation maps and instructions. The relief projector 1750 may be in communication with the presentation sensor 1724 and optionally may include a controller or may be in communication with the controller 160. The relief projector 1750 may be substantially the same as the relief projector 150 and be configured to selectively display an auxiliary or backup content onto the projection surface 1712 of the sign 1710.

In the event of a display malfunction or failure such as failure of the light source, or other event that causes the information 1716 on the display 1710 to no longer be visible or clear, the sensor 1724 may detect the change and activate the relief projector 1740. The relief projector 1740 may be oriented to project an image onto the projection area of the display 1710 and provide auxiliary content or information. In this example, the relief projector 1740 may be positioned so as to project the information onto an outer surface of the sign 1710, whereas the sign may be internally illuminated (i.e., the relief projector 1740 may project images onto an opposite side of the projection surface 1712 as compared to the main projector or light source). However, in other examples, the relief projector 1740 may be arranged as shown in FIG. 1 and be positioned to project onto the same side as the main light source or projector.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims

What is claimed is:

1. A projection system comprising:
   at least one main projector that when activated projects a first image onto main projection area of a projection surface;
   a relief projector that when activated projects a second image onto a backup projection area of the projection surface, wherein the relief projector comprises:
      a light source projecting a light beam along an optical axis;
      at least one optical member for directing light onto the projection surface; and
      a light-altering member configured to alter the light beam to form the second image;
   a presentation sensor for sensing at least one characteristic of the at least one main projector or the first image; and
   a controller in electrical communication with the presentation sensor, wherein the controller activates the relief projector in response to the presentation sensor.

2. The projection system of claim 1, wherein the projection surface is non-planar.

3. The projection system of claim 1, wherein the main projection area and the backup projection area substantially overlap.

4. The projection system of claim 1, wherein the main projection area and the backup projection area are substantially coextensive.

5. The projection system of claim 1, wherein the relief projector is a gobo projector and the light-altering member is a gobo member.

6. The projection system of claim 1, wherein the light-altering member alters at least one of a light intensity, a polarization, a direction, a focus, a color, and/or a frequency of the light source.

7. The projection system of claim 1, wherein the light-altering member is formed by one of etching, printing, exposing, and molding.

8. The projection system of claim 1, wherein the light-altering member is reversibly aligned with the optical axis.

9. The projection system of claim 1, wherein the second image substantially aligns with the main projection area when projected onto the projection surface.

10. The projection system of claim 1, wherein the light source is a light emitting diode.

11. The projection system of claim 1, wherein the beam of light is one of collimated, coherent, and shaped.

12. The projection system of claim 1, wherein the at least one characteristic is one of an ambient light intensity, a main projector projection intensity, a temperature of the main projector, a vibration of the main projector, an operational state of the main projector, and/or a first image quality.

13. The projection system of claim 1, wherein
the main projector further comprises a main power source,
the relief projector further comprises a backup power source, wherein the main power source and backup power source are independent from one another.

14. The projection system of claim 1, wherein
the relief projector further comprise an environmental sensor, wherein the environmental sensor is configured to sense an ambient light intensity of the projection surface and based on the ambient light, a projection intensity of the relief projector is selectively varied.

15. A projection system comprising:
at least one primary projector that when activated projects a first image along a first optical axis onto a projection surface;
a secondary projector that when activated projects a second image along a second optical axis onto the projection surface, the second optical axis being substantially aligned with the first optical axis, wherein the secondary projector comprises:
a light source projecting a light beam along the second optical axis;
at least one optical member for directing light onto the projection surface; and
a light-altering member configured to alter the light beam to form the second image;
a presentation sensor capable of sensing at least one characteristic of the first image or the at least one primary projector; and
a control system in communication with the sensor, wherein the control system selectively activates the secondary projector in response to the presentation sensor.

16. A method of controlling a projection system comprising:
projecting a main show onto a projection surface using a main projector;
monitoring by a first sensing element at least one output characteristic of the main show and/or the main projector;
analyzing by a processing element a signal from the first sensing element to determine if a predetermined fault condition has been reached; and
responsive to the predetermined fault condition being reached, selectively activating a relief projector by the processing element, wherein the relief projector projects a backup show having at least one backup image onto the projection surface.

17. The method of claim 16, wherein the main show is projected onto a main projection area on the projection surface and the backup show is projected onto a backup projection area on the projection surface.

18. The method of claim 17, wherein the main projection area and backup projection area are substantially aligned.

19. The method of claim 17, further comprising controlling by the processing element the backup show to project onto the projection surface when the main show is not being projected onto the projection surface.

20. The method of claim 19,
wherein the relief projector projects a backup image, the backup image being a portion of the backup show; and
the method further comprises determining by a processing element if the main show has completed.

21. The method of claim 16, wherein the characteristic of the projection system is one of ambient light intensity, main projector projection intensity, a temperature of the main projector, sound, vibration, voltage, or first image quality.

22. A backup control system, comprising:
a presentation device for projecting a presentation onto a presentation area;
a presentation sensor that detects at least one characteristic of the presentation device or the presentation;
a processing element in electrical communication with the presentation sensor and configured to analyze a signal from the presentation sensor to determine if a predetermined fault condition has been reached; and
an auxiliary projector in electrical communication with the processing element for projecting an auxiliary content onto the presentation area; wherein
the processing element activates the auxiliary projector in response to the presentation sensor determining that the predetermined fault condition has been reached.

* * * * *